United States Patent
Hara et al.

(10) Patent No.: US 9,293,155 B2
(45) Date of Patent: *Mar. 22, 2016

(54) SUBSTRATES FOR THIN-FILM MAGNETIC HEADS, MAGNETIC HEAD SLIDERS, AND HARD DISK DRIVE DEVICES

(71) Applicants: NIPPON TUNGSTEN CO., LTD., Fukuoka-shi, Fukuoka (JP); HITACHI METALS, LTD., Minato-ku, Tokyo (JP)

(72) Inventors: Yusuke Hara, Fukuoka (JP); Shinzoh Mitomi, Fukuoka (JP); Shigeru Matsuo, Fukuoka (JP); Hidetaka Sakumichi, Kumagaya (JP)

(73) Assignees: NIPPON TUNGSTEN CO., LTD., Fukuoka (JP); HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,189

(22) Filed: Jun. 26, 2015

(65) Prior Publication Data

US 2015/0380024 A1    Dec. 31, 2015

(30) Foreign Application Priority Data

Jun. 30, 2014  (JP) ................................. 2014-134419

(51) Int. Cl.
| G11B 21/21 | (2006.01) |
| G11B 5/10 | (2006.01) |
| G11B 5/105 | (2006.01) |
| G11B 5/60 | (2006.01) |

(52) U.S. Cl.
CPC . *G11B 5/10* (2013.01); *G11B 5/105* (2013.01)

(58) Field of Classification Search
None
See application file for complete search history.

(56) References Cited

U.S. PATENT DOCUMENTS

| 5,595,946 | A | 1/1997 | Tsujimoto et al. |
| 6,333,103 | B1 * | 12/2001 | Ishii et al. ............ C23C 16/0272 428/701 |
| 7,939,181 | B2 * | 5/2011 | Ramm et al. ......... C23C 14/0021 428/701 |
| 2010/0061013 | A1 | 3/2010 | Nakazawa et al. |
| 2010/0315743 | A1 | 12/2010 | Wang et al. |

FOREIGN PATENT DOCUMENTS

| JP | 02-141467 | 5/1990 |
| JP | 08-034662 | 2/1996 |
| JP | 2008-084520 | 4/2008 |
| JP | 2009-110571 | 5/2009 |
| JP | 2009-120428 | 6/2009 |
| WO | WO 2008-056710 A1 | 5/2008 |

* cited by examiner

*Primary Examiner* — Craig A. Renner
(74) *Attorney, Agent, or Firm* — Nixon Peabody LLP; Jeffrey L. Costellia

(57) ABSTRACT

An AlTiC-based substrate suitable for a thin-film magnetic head is provided. The $Al_2O_3$—TiC based substrate for a thin-film magnetic head including an $Al_2O_3$ phase and a TiC phase, wherein a c-axis lattice constant of the $Al_2O_3$ phase is 12.985 Å or more and 12.992 Å or less, and a lattice constant of the TiC phase is 4.297 Å or more and 4.325 Å or less.

8 Claims, 4 Drawing Sheets

SUBSTRATES FOR THIN-FILM MAGNETIC HEADS, MAGNETIC HEAD SLIDERS, AND HARD DISK DRIVE DEVICES

BACKGROUND OF THE INVENTION

1. Technical Field

The present invention relates to a substrate for a thin-film magnetic head utilized for a magnetic head slider of a hard disk drive device.

2. Description of the Related Art

Recently, the information content of multimedia data is increasing more and more in association with the requirements of higher definition for video and the like. In addition, it is required for the capacity of an information recording device for recording such video to increase. Hard disk drive devices are information recording devices used as data storing devices of personal computers, recording devices connected to television sets, and the like. For such a hard disk drive device, it is required to increase the capacity thereof and to minimize the size thereof.

FIG. 1A schematically shows a thin-film magnetic slider assembly 10 and a disk (a platter) 13 as a magnetic recording medium included in a general hard disk drive device (hereinafter, sometimes referred to as an HDD). As shown in FIG. 1A, a slider 10A held by a gimbal 14 includes a base portion 11 and a reading element and a writing element 12 (hereinafter sometimes simply referred to as a transducer 12) provided on one end portion of the base portion 11. A unit held by the gimbal 14 is referred to as a head slider, or sometimes simply referred to as a slider.

The writing element of the transducer 12 is formed from a magnetic material. A coil is wound on the inside of a ring, and a magnetic field is generated in the writing element by applying a recording signal to the coil. In this way, data is written onto a disk 13. On the other hand, the reading element as a reproducing head is a magneto-resistive (MR or GMR) effect element, a tunneling magneto-resistive (TMR) effect element, or the like for converting the variation in magnetic field into the variation of electric resistance. The reading element reads magnetic data recorded on the disk 13, and converts the data into electric signals.

The substrate 11 for holding the transducer 12 was often formed by an $Al_2O_3$—TiC-based ceramic sintered body. This is because $Al_2O_3$—TiC (hereinafter abbreviated to AlTiC) is superior and well-balanced in respect of the thermal property, the mechanical property, and the workability.

In order to increase the storage capacity of HDD, it is required to increase the recording density of the disk 13. Currently, the recording density of HDD reaches about 750 Gbit/square inch. In order to accurately realize the writing/reading operation in such a situation of high recording density, the gap between the transducer 12 and the disk 13 during the operation is preferably small. At present, the gap is as small as 10 nm or less.

In association with the smaller size and higher capacity of a hard disk drive device, the floating height of the thin-film magnetic head from the disk is low, and a higher degree of surface roughness is required for the air bearing surface (ABS) 11a of the slider of the thin-film magnetic head. The ABS 11a is a surface of the base portion 11 facing to the disk 13 in the slider. The shape thereof is designed such as that the ABS 11a is caused to stably float by an appropriate distance from a disk surface due to air flow generated by the rotation of the disk 13 (see, FIG. 1B).

In order to realize the desired shape of the ABS, the base portion 11 is required to have a property to be accurately worked at a nano-level. In general, the base portion 11 is first worked to be flat via a lapping step (a grinding step with a lapping apparatus), and then worked to have the shape with which the above-mentioned air flow can be appropriately utilized by using a dry etching method such as ion milling, ion beam etching, or other methods. In the condition after the above-mentioned lapping step, the worked surface of the base portion 11 is preferably an extremely smooth flat plane.

The gap between the disk 13 and the transducer 12 during the operation may be varied by a factor other than the smoothness of the base portion 11. Hereinafter such a factor will be exemplarily described.

As shown in FIG. 2A and FIG. 2B, the thin-film magnetic head (the slider) 20 is formed by laminating, for example, an AlTiC substrate (the base portion) 21, an $Al_2O_3$ film 22, a transducer 23, and an $Al_2O_3$ film 24. The $Al_2O_3$ films 22 and 24 are typically amorphous alumina. When a thin-film magnetic head 20 is manufactured, a plane 25 which will be an ABS (corresponding to the cut-out plane obtained by cutting the substrate 21 having a thickness t into rod-like bodies 21' as shown in the lower right portion of FIG. 2B) is first polished to be flat. The plane 25 which will be the ABS (hereinafter referred to as an ABS forming plane) corresponds to a sectional plane of the lamination including the AlTiC substrate 21, the $Al_2O_3$ films 22 and 24, and the transducer 23.

In the ABS forming plane 25, since the AlTiC substrate 21, the $Al_2O_3$ films 22 and 24, and the transducer 23 are exposed, the difference in hardness among these elements becomes a problem when the ABS forming plane 25 is polished. The Vickers hardnesses Hv of the $Al_2O_3$ phase and the TiC phase of the AlTiC substrate 21 are 2000 or more, respectively. The Vickers hardnesses Hv of the amorphous $Al_2O_3$ films 22 and 24, and the transducer 23 (metal) are 700 to 900, and 100 to 300, respectively.

Accordingly, if the ABS forming plane 25 is polished so that the polishing amount of the surface of the AlTiC substrate 21 (especially TiC phase) as the main constituting portion of ABS is optimum, the $Al_2O_3$ films 22 and 24, and the transducer 23 having the lower hardnesses than the TiC phase are excessively polished. As a result, in the ABS forming plane 25 which is to be flat, the portion corresponding to the $Al_2O_3$ films 22 and 24 is lower than the portion corresponding to the AlTiC substrate 21, and the portion corresponding to the transducer 23 is disadvantageously further lower than the portion.

Generally, the step difference is referred to as a pole tip recession (hereinafter abbreviated to "PTR"). Due to the generation of the PTR, an extra gap is formed between the transducer and the magnetic recording medium. This may prevent the increase in recording density and the increase of capacity of the hard disk drive.

As described above, in order to increase the recoding density of HDD, it is required that the distance between the slider and the disk during the operation is controlled as precisely as possible. For example, WO2008/056710 describes a technique in which the organization of an AlTiC substrate manufactured as a sintered body is appropriately formed, so that the mechanical workability can be improved. When an AlTiC substrate with such superior workability is used, a magnetic head with high shape accuracy can be manufactured. Thus, the floating amount of the magnetic head with respect to the disk can be controlled with high accuracy.

One of planes of a slider base portion formed from an AlTiC substrate is subjected to dry etching such as ion beam etching or RIE (reactive ion etching) so as to have the shape of ABS. In the dry etching step, if there are phases of which the etching rates are different, there may sometimes arise a problem that the surface roughness after the dry etching is drastically deteriorated. For example, even if the etching amounts of the $Al_2O_3$ phase and the TiC phase included in the AlTiC substrate can be uniform, in the case where an $Al_2TiO_5$ phase (an aluminum titanate phase) is generated as a third phase, the etching amount is not uniform. As a result, the surface roughness after the dry etching is sometimes drastically deteriorated.

In the case where the size of a slider is small, when a current flows through a coil which constitutes the transducer, there arises a problem that the quantity of heat generated per unit volume may increase. In this case, the reading element and the writing element are caused to expand due to heat, so as to protrude toward the magnetic recording medium. As described above, the gap between the transducer and the disk during the operation is set to be only about 10 nm, so that the transducer caused to thermally expand may disadvantageously come into contact with the magnetic recording medium.

Such a problem is called as TPTR (Thermal Pole Tip Recession) and is caused by a difference between the coefficient of thermal expansion of the AlTiC substrate portion and the coefficient of thermal expansion of the metal portion constituting the transducer. As a result, during the operation, the transducer comes closer to the side of the disk than expected. The TPTR may easily occur when the thermal conductivity of the slider substrate is small and it is difficult for the heat to escapes. In the case where the transducer is damaged by the contact with the magnetic recording medium due to the TPTR, there arises a serious trouble that the hard disk drive device does not function.

Even when the transducer does not come into contact with the magnetic recording medium, the gap between the magnetic recording medium and the transducer varies due to the thermal expansion of the transducer. For example, when the transducer expands by several nanometers, the gap between the magnetic recording medium and the transducer varies by 10% or more. Accordingly, the writing characteristics and the reading characteristics are largely changed, and some error occurs in the signal written into the magnetic recording medium or the signal read out from the magnetic recording medium.

The AlTiC substrate constituting the base portion of the slider is made from composite ceramic material including the $Al_2O_3$ phase and the TiC phase. For this reason, there arise various problems because of the difference in properties of the two phases. As described above, both of the $Al_2O_3$ phase and the TiC phase have very hard characteristics, but in more detail, in the AlTiC substrate, the TiC phase is harder than the $Al_2O_3$ phase. Thus, there is a difference in hardness between the two phases. Accordingly, when the AlTiC substrate is subjected to lapping, the $Al_2O_3$ phase is more ground than the TiC phase. As a result, a step difference (concave and convex) may be sometimes caused in the surface of the AlTiC substrate after the lapping (hereinafter, sometimes referred to as a lapped surface or a lapping worked surface). When the smoothness of the surface of the AlTiC substrate is degraded, the control of air flow between the head and the disk is unstable. As a result, the designed floating amount of the head cannot be obtained, or the floating amount is disadvantageously unstable.

The smoothness is important in the ABS formed by ion milling, or the like. In order to reduce the variation in surface roughness of the ABS obtained by working the shape of a plane, it is preferred to decrease micropores included in the AlTiC substrate. The technique for decreasing such micropores is described in WO2008/056710.

As described above, for the AlTiC substrate for a thin-film magnetic head, various characteristics are required. Especially, the smoothness of the AlTiC substrate after working is important in HDD with smaller size and larger capacity. In addition, it is required that any malfunction does not occur by the influence of TPTR caused by the heat during the operation.

The present invention has been conducted in view of the above-described problems, and the objective thereof is to provide an AlTiC-based substrate for a thin-film magnetic head, and a magnetic head slider and an HDD which utilize the substrate.

SUMMARY OF THE INVENTION

The $Al_2O_3$—TiC based substrate for a thin-film magnetic head in one embodiment of the present invention includes an $Al_2O_3$ phase and a TiC phase, wherein a c-axis lattice constant of the $Al_2O_3$ phase is 12.985 Å (1.2985 nm) or more and 12.992 Å (1.2992 nm) or less, and a lattice constant of the TiC phase is 4.297 Å (0.4297 nm) or more and 4.325 Å (0.4325 nm) or less. It is noted that 1 Å=0.1 nm.

In one embodiment, the c-axis lattice constant of the $Al_2O_3$ phase is 12.991 Å (1.2991 nm) or less.

In one embodiment, the c-axis lattice constant of the $Al_2O_3$ phase is 12.990 Å (1.2990 nm) or less.

In one embodiment, the c-axis lattice constant of the $Al_2O_3$ phase is 12.989 Å (1.2989 nm) or more.

In one embodiment, the lattice constant of the TiC phase is 4.318 Å (0.4318 nm) or more and 4.325 Å (0.4325 nm) or less.

In one embodiment, the lattice constant of the TiC phase is 4.297 Å (0.4297 nm) or more and 4.315 Å (0.4315 nm) or less.

The magnetic head slider in one embodiment of the present invention utilizes one of the above-mentioned $Al_2O_3$—TiC based substrates for a thin-film magnetic head.

The hard disk drive device in one embodiment of the present invention is provided with the magnetic head slider.

According to the invention, a substrate for a thin-film magnetic head with superior surface smoothness and good thermal conductivity can be obtained. In the magnetic head slider manufactured by using such a substrate, the floating amount from a disk can be more accurately controlled, and the heat from a transducer can be easily escaped, so that it is possible to prevent the occurrence of operation failure due to TPTR. Therefore, the present invention can contribute to the reduction in size and the increase in capacity of HDD.

BRIEF DESCRIPTION OF THE DRAWINGS

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

powder condition used as a material, and Region B: an $Al_2O_3$ phase in the condition after the sintering of AlTiC), respectively.

Figure 4:
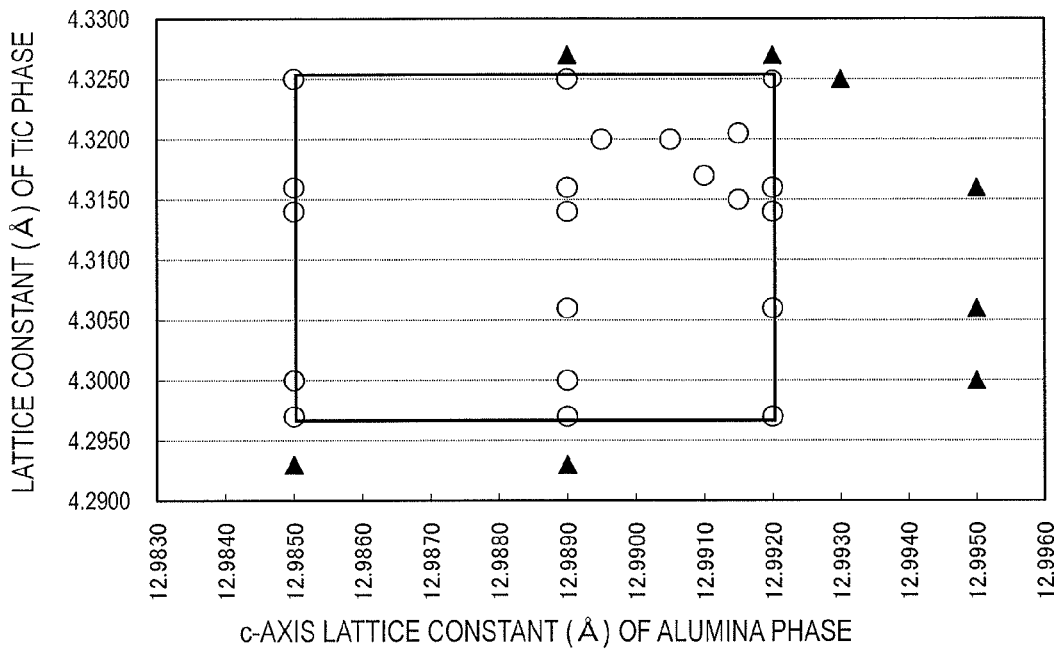

FIG. 4 is a diagram showing the distribution of embodiments of the present invention and comparative examples in which the c-axis lattice constants of the $Al_2O_3$ phase and the lattice constants of the TiC phase are different.

Figure 5:
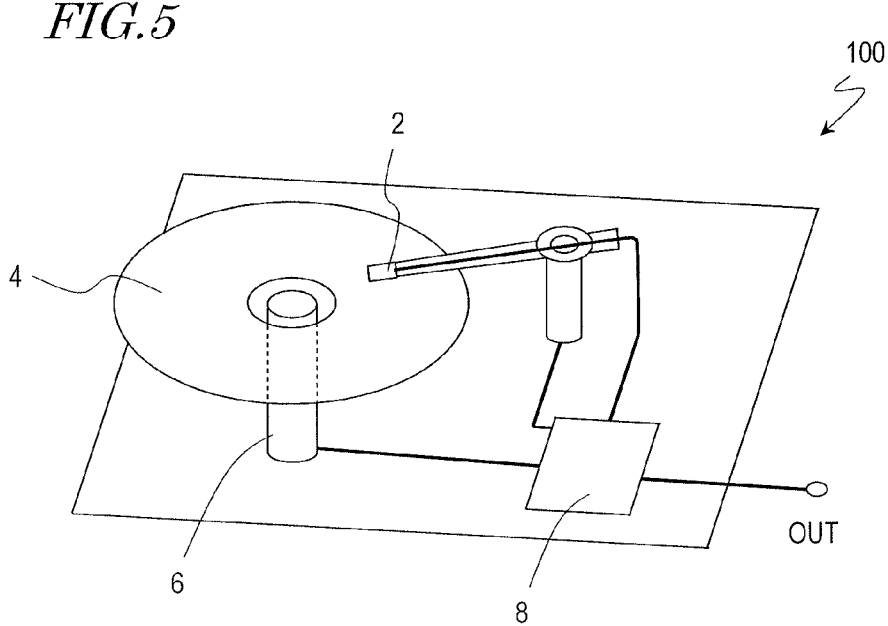

FIG. 5 is a schematic perspective view showing the configuration of a hard disk drive device in one embodiment of the present invention.

DETAILED DESCRIPTION OF PREFERRED EMBODIMENTS

Hereinafter, preferred embodiments of the present invention will be described with reference to the accompanying drawings. However, the present invention is not limited to those described below.

A substrate for a thin-film magnetic head according to an embodiment of the present invention is an $Al_2O_3$—TiC-based substrate (hereinafter referred to as an AlTiC substrate) including an $Al_2O_3$ phase and a TiC phase. In the AlTiC substrate of this embodiment, typically, the $Al_2O_3$ phase constitutes a matrix phase, and an organization in which the TiC phase is dispersed in the $Al_2O_3$ matrix phase is formed.

Herein the $Al_2O_3$ phase is a phase constituted by an $Al_2O_3$ crystal and a crystal in which other element is substituted for part of elements constituting the $Al_2O_3$ crystal. The TiC phase is a phase constituted by a TiC crystal and a crystal in which other element is substituted for part of elements constituting the TiC crystal.

It is noted that the $Al_2O_3$ phase and the TiC phase can be easily identified, for example, by observation with an optical microscope or SEM (scanning electron microscope). In the thus-identified $Al_2O_3$ phase and the TiC phase, a lattice constant of the $Al_2O_3$ phase and a lattice constant of the TiC phase are obtained by using X-ray diffraction as described later.

Herein in the substrate for the thin-film magnetic head of this embodiment, the c-axis lattice constant of the $Al_2O_3$ phase is set to be 12.985 Å or more and 12.992 Å or less. The $Al_2O_3$ (aluminum oxide (III)) may sometimes be referred to as alumina (α-alumina) in general. Also in this specification, $Al_2O_3$ may sometimes be referred to as alumina.

The lattice constants of the alumina phase and the TiC phase may not necessarily be completely uniform in the AlTiC substrate, but may be slightly different depending on measured points. In such a case, an average of values obtained by the measurements of several or more different points of the substrate may be regarded as a lattice constant in the AlTiC substrate.

Figure 3A:
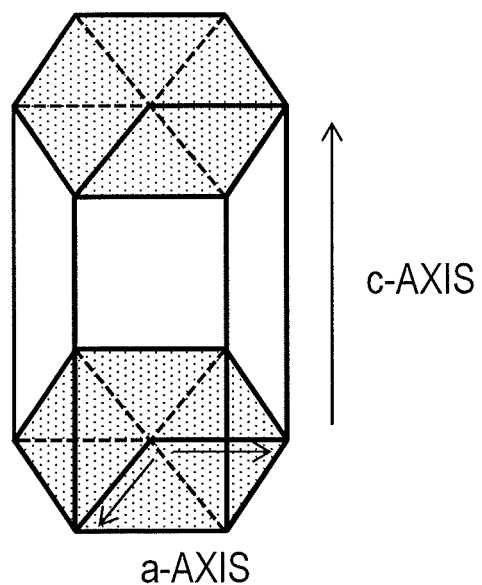
FIG. 3A is a perspective view of a crystal structure of alumina.
Figure 3B:
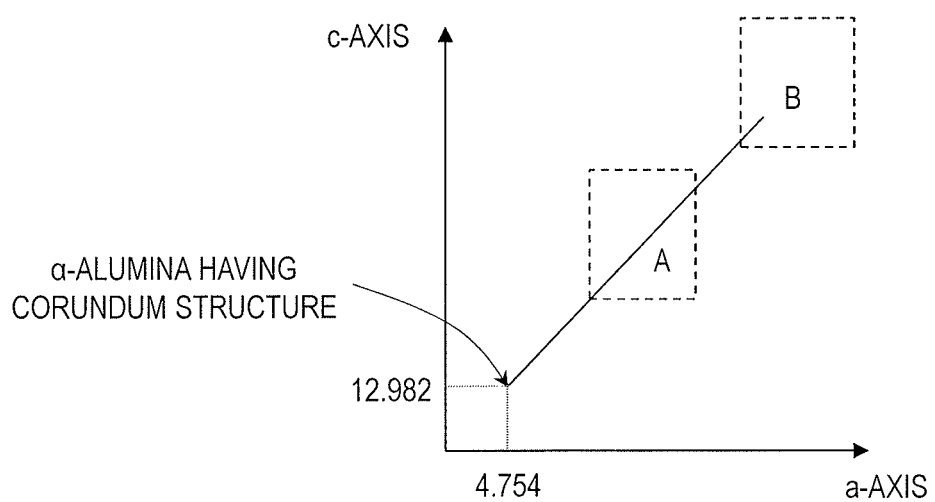
FIG. 3B is a graph showing lattice constants (a-axis and c-axis) of reference data of α-alumina (Region A.

The lattice constant of the alumina phase will be described below. The alumina crystal has a crystal structure of trigonal system. As shown in FIG. 3A, the crystal structure approximates pseudo hexagonal crystal, so that lattice constants can be shown along a-axis and c-axis. As shown in FIG. 3B, it is known that in the α-alumina having a corundum structure, the a-axis lattice constant is 4.754 Å, and the c-axis lattice constant is 12.982 Å.

As shown as the region A of FIG. 3B, in the alumina material powder for manufacturing the AlTiC substrate, the a-axis and c-axis lattice constants are larger, respectively. It is considered that this is a phenomena which occurs due to remaining impurity elements such as Na, Mg, and Ca other than Al and O in the process of producing the alumina material powder from mineral ore. The atomic radii of such elements are larger than that of Al, so that as the impurity elements are more substituted, the size of crystal lattice tends to increase.

In some cases, the AlTiC substrate may be manufactured with higher sintering property by performing the sintering step while adding MgO, $Y_2O_3$, or the like as sintering aid to alumina and TiC in material powder condition, which will be described later. When the sintering aid is added in such a way, some other element is substituted for part of Al atoms in the sintering step. As a result, in the manufactured AlTiC substrate, the lattice constants along a-axis and c-axis of the $Al_2O_3$ phase in the AlTiC substrate may sometimes be much larger, as shown in the region B of FIG. 3B.

As described above, the lattice constant of the $Al_2O_3$ phase in the AlTiC substrate may be varied depending on various factors in the production process. Thus, the inventors of this invention focused on the c-axis lattice constant of the $Al_2O_3$ phase which has not been examined, and earnestly performed experiments and investigation about the influence of the c-axis lattice constant of the $Al_2O_3$ phase on the smoothness or the like of the surface in the AlTiC substrate utilized as a magnetic head slider.

As a result, it was found that when the c-axis lattice constant of the $Al_2O_3$ phase was set to be 12.985 Å or more and 12.992 Å or less, the smoothness of the lapping worked surface (the flatness after the lapping step) could be improved, and the occurrence of defect due to TPTR could be more surely prevented.

It is considered that the reason is that when the c-axis lattice constant of the $Al_2O_3$ phase is in the range of 12.985 Å or more and 12.992 Å or less, a sintered body of an AlTiC substrate having $Al_2O_3$ phase which is more closer to α-alumina with corundum structure and contains less amount of impurity is fabricated, and thus the polishing process in the lapping step is performed in the condition where a smooth surface can be easily formed. It is noted that the smoothness of the lapped surface can be represented by an average roughness Ra (nm) of the lapped surface (in the present specification, it indicates an arithmetic average roughness Ra defined by Japanese Industrial Standard (JIS) Nos. JIS B 0601:1944 and JIS B 0031:1994). The lattice constant of the $Al_2O_3$ phase is closer to that of the α-alumina with corundum structure, so that the hardness is maintained. As a result, the difference in hardness of the TiC phase is reduced, and the difference in smoothness due to the difference in hardness between two phases is not caused to increase.

In this embodiment of the present invention, the amount of impurity contained in the AlTiC substrate obtained after sintering is reduced by special selection of alumina powder or by suppression of the addition amount of sintering aid. More specifically, as the material powder of alumina, a material powder in which the content of impurities such as Na, Mg, and Ca (existing in solid solution state in the crystal lattice of alumina) is 100 ppm or less, for example, is used. In addition, the sintering aid which intrudes into the alumina crystal lattice which forms the alumina phase in the sintering is used by an extremely small amount or is not used at the mixing of powder, so that the c-axis lattice constant of the $Al_2O_3$ phase in the sintered body is made to be a fixed value or less.

From the viewpoint of the improvement of smoothness of the lapping worked surface, it is preferred that the c-axis lattice constant of the $Al_2O_3$ phase is 12.985 Å or more and 12.992 Å or less, and more preferably 12.991 Å or less, and further more preferably 12.990 Å or less. This is because since the c-axis lattice constant of the $Al_2O_3$ phase is low, the hardness and the lapping workability are closer to those of α-alumina with corundum structure, so that the difference in polishing rate from the TiC phase can be reduced as compared with the $Al_2O_3$ phase in the AlTiC substrate. Due to the small difference in polishing rate between the $Al_2O_3$ phase and the TiC phase, the surface after polishing is further smooth.

In addition to the advantage that the lapping worked surface could be smooth, the inventors of the present invention confirmed that the defect of collision of the transducer with the disk due to the TPTR (Thermal Pole Tip Recession) could be reduced if the c-axis lattice constant of $Al_2O_3$ phase was in the range of 12.985 Å or more and 12.992 Å or less. It is considered that this is because in the AlTiC substrate of this embodiment, the thermal conductivity (W/(m·K)) is relatively high, and hence the heat generated during the writing or reading operation is easily released externally via the AlTiC substrate. In general, as a metal constituting the transducer, Fe, Co, Ni, or Fe—Pt material is mainly utilized, and thermal conductivities thereof are relatively larger, e.g. twice or three times as large as that of the AlTiC substrate. Therefore, expansion of the transducer is easily caused to occur due to the heat during the operation, but the heat releasing property of the slider can be enhanced by using the AlTiC substrate with the lattice constant of alumina phase in the above-mentioned range, so that the occurrence of defect due to TPTR can effectively be suppressed.

From the viewpoint of the prevention of defect occurrence due to TPTR, the c-axis lattice constant of the $Al_2O_3$ phase is preferably 12.991 Å or less, and more preferably 12.990 Å or less.

As is seen from the above description, in order to increase the smoothness and the thermal conductivity of the lapping worked surface, it is preferred that the c-axis lattice constant of the $Al_2O_3$ phase is as low as possible. By considering the industrial availability, the c-axis lattice constant of the $Al_2O_3$ phase is preferably 12.985 Å or more, and more preferably 12.989 Å or more.

In the substrate for a thin-film magnetic head in this embodiment, the lattice constant of the TiC phase in the AlTiC substrate is set to be 4.297 Å or more and 4.325 Å or less. Herein the TiC crystal is an NaCl-type crystal (cubic system), and lattice constants in respective directions in the crystal have the same value (i.e. a value represented as an a-axis lattice constant.) In the present specification, the lattice constant of the TiC phase indicates the above-mentioned value.

The TiC phase may have composition ratios from $TiC_{0.5}$ to $TiC_{1.0}$. As the amount of C with respect to Ti is reduced, the lattice constant of the TiC phase tends to decrease. When O (oxygen) and/or N (nitrogen) is substituted for part of C of the TiC phase, the lattice constant decreases. It is noted that, in the material powder having the composition ratio closer to the stoichiometric ratio (TiC material powder which is practically available and of which the atomic ratio of C to Ti is about 0.95), the lattice constant is approximately from 4.327 Å or more to 4.330 Å or less.

In order to set the lattice constant of the TiC phase in the AlTiC substrate in the above-mentioned range, for example, a material powder of which the atomic ratio of C to Ti is about 0.5 to 0.95 is selected, and the amount of $TiO_2$ (or TiOx (x is 0.5 or more and less than 1), $Ti_2O_3$, $Ti_3O_5$ and the like) or TiN used as an additive is regulated, thereby setting the lattice constant of TiC phase after sintering in an appropriate range. In addition, by appropriately regulating the oxygen partial pressure and the nitrogen partial pressure in the sintering atmosphere, it is possible to adjust the lattice constant of the TiC phase. More specific examples include a method in which the amount of oxygen taken from water, air, or the like is increased in the steps of mixing, grinding, drying, or granulation of powders, or a method in which the amount of nitrogen is increased while the $N_2$ partial pressure is in the range of 13 kPa to 90 kPa in the atmosphere of sintering (increase in quantity of nitrogen).

In the case where the lattice constant of the TiC phase in the AlTiC substrate was in the range of 4.318 Å to 4.325 Å, it was confirmed by the inventors that the occurrence of defective by TPTR could be further effectively suppressed. It is considered that this is because the organization structure close to the TiC crystal which does not include other elements (O or N, for example) is formed in the TiC phase in the AlTiC substrate, so that the thermal conductivity of the AlTiC substrate is further improved.

In the case where the lattice constant of the TiC phase in the AlTiC substrate was in the range of 4.318 Å to 4.325 Å, it was found that the number of minute pores (hereinafter sometimes referred to as micropores) generated in the AlTiC substrate could be reduced. It is considered that this is because, as compared with the case where the organization structure close to the TiC crystal which does not include O or N in the TiC phase, if TiOx, TiN, or the like was added, the lattice constant of the TiC phase was lowered to the above-mentioned range, but the sintering property was remarkably improved by the added TiOx or the like. As a result, dense sintered body was formed and the occurrence of micropores could be prevented. The element O or N is not only supplied from the additives but also supplied in such a way that the element O or N is substituted for part of C of the TiC phase from the sintering atmosphere. In this case, the sintering property can be also improved.

However, it was found that in the case where the amount of O or N taken by the additives or the sintering atmosphere is too large, and the lattice constant of the TiC phase after the sintering was lower than 4.318 Å, micropores were rather caused to easily occur. It is considered that this is because when the element O or N is taken into the TiC phase, the substituted C is exhausted as a CO gas, for example, in the sintering step, and if the amount is large, the gas remains in the sintered body, so as to form micropores.

Accordingly, in the case where the content of O or N in the TiC phase in the AlTiC substrate is in a specific range, and the lattice constant of the TiC phase after sintering is in the range of 4.318 Å to 4.325 Å, the generation of micropores can be reduced. In the case of less micropores, the condition with less variation in surface roughness can be maintained after forming ABS on the surface of the AlTiC substrate by ion milling or the like, so that the possibility that any strange particle may be caught in a particle pocket (a gap into which a particle is caught) during the operation and the HDD may be crushed can decrease.

In the case where the lattice constant of the TiC phase was in the range of 4.318 Å to 4.325 Å, it was confirmed by the inventors that the occurrence of defect due to TPTR could be further suppressed. It is considered that this is because with the crystal structure closer to the TiC as reference data, the thermal conductivity of the AlTiC substrate is further improved, and hence heat can be easily escaped from the transducer during the operation.

In the case where the lattice constant of the TiC phase was in the range of 4.297 Å to 4.315 Å, it was confirmed by the inventors that the cutting workability and the lapping rate were improved, so that the industrial productivity could be intendedly increased. In addition, in the case where the lattice constant of the TiC phase was in the range of 4.297 Å to 4.315 Å, it could be also confirmed that the smoothness of the lapping worked surface after the lapping step could be further improved.

Herein the cutting workability indicates the easiness of cutting work when the AlTiC substrate is cut into chips. The cutting workability can be, for example, evaluated by the number of cut bars which can be cut until the resistance value in the cutting reaches a predetermined value. The larger number of cut bars means the higher productivity.

The lapping rate means a polishing amount per unit period of time (μm/min) in the polishing step performed by using a lapping apparatus. In the case where the workability of the object to be worked is good, the lapping rate increases, thereby improving the productivity.

In order to attain both of advantages that a relatively smooth ABS can be formed and that the productivity is improved, the lattice constant of the TiC phase may be set to be 4.310 Å to 4.320 Å, or may be set to be 4.313 Å to 4.318 Å.

The thermal conductivity and the cutting workability can be controlled by setting the mass ratio between the alumina phase and the TiC phase in the sintered body within a predetermined range. It was confirmed by the inventors that the smoothness of the lapped surface and the number of occurrence of micropores were not so varied depending on the above-mentioned mass ratio in the sintered body.

In this embodiment, in order to effectively prevent the TPTR and also to improve the cutting workability, it is sufficient that the ratio between the alumina phase and the TiC phase after sintering be in an appropriate range. For this purpose, in the stage of the mixed powder for sintering, such a mass ratio is preferred that the total amount of the material powder used for forming the TiC phase (for example, TiC powder and $TiO_2$ powder) is 25 to 50 mass % of the total, and the balance is made up of the material powder for forming the alumina phase (for example, alumina powder). In more preferred mass ratio, the total amount of the material powder for forming the TiC phase is 35 to 45 mass % of the total of the mixed powder.

In order to form ABS on the obtained AlTiC substrate, dry etching such as ion milling is performed. It was confirmed that, in the case where the c-axis lattice constant of the $Al_2O_3$ phase was 12.985 Å or more and 12.992 Å or less, and the lattice constant of TiC phase was 4.297 Å or more and 4.325 Å or less, a phase with different etching rate was hardly generated and the degradation of surface roughness after dry etching could be prevented.

Hereinafter the production method of the AlTiC substrate in the embodiment according to the present invention will be described.

First, alumina powder, TiC powder, and $TiO_2$ powder are prepared as material powders. At this time, it is preferred that powder of the condition closer to alumina with corundum structure containing less amount of impurity be prepared as the alumina powder. For this purpose, for example, alumina powder in which the amount of contained impurity (for example, Na, Mg, Ca, or the like) is 100 ppm or less, and of which the c-axis lattice constant is about 12.983 Å to 12.991 Å may be used.

The respective material powders are ground so as to have desired average particle sizes by using a ball mill or the like. For example, respective average particle sizes of the alumina powder, the TiC powder, and the $TiO_2$ powder are 0.2 to 0.6 μm, 0.02 to 1.0 μm, and 0.02 to 0.2 μm. In this specification, the term "average particle size" means the d50 average particle size (the median diameter at 50% in the cumulative distribution) obtained by laser diffraction.

Alternatively, the grinding step is not performed individually for each powder, but the mixing and the grinding may be performed simultaneously. The mixing and grinding step can be performed by using a vibration mill, a colloid mill, an Attritor, a high speed mixer, or the like, instead of the ball mill.

The reason why the average particle size of the alumina material powder is set in the range from 0.2 μm to 0.6 μm is that if it is less than 0.2 μm, the formability is degraded, so that there is a possibility that the sintering step may not appropriately be performed. In addition, if the average particle size thereof exceeds 0.6 μm, the densification of the sintered body is not sufficient, so that there is a possibility that the strength may be insufficient.

The reason why the average particle size of the TiC material powder is set in the range from 0.02 μm to 1.0 μm is that if it is less than 0.02 μm, the formability is liable to be degraded, so that there is a possibility that the sintering step may not be appropriately performed. In addition, if the average particle size thereof exceeds 1.0 μm, the sintering property is degraded, so that there is a possibility that a dense sintered body may not be obtained.

The reason why the average particle size of the $TiO_2$ material powder is set in the range of 0.02 μm to 0.2 μm is that if it is less than 0.02 μm, the powder is liable to be aggregated. In addition, if the average particle size thereof is more than 0.2 μm, the function for promoting the sintering step is deteriorated, so that it is difficult to obtain a dense sintered body.

Next, the respective powders are mixed at a predetermined ratio, and a slurry is formed by wet milling, for example. The slurry is dried, thereby obtaining mixed powder for sintering. Herein in the mixed powder for sintering, when the total mass of the $Al_2O_3$ powder, the TiC powder, and $TiO_2$ powder is regarded as 100 mass %, the mass % of the $Al_2O_3$ powder is 50 mass % or more and 75 mass % or less, for example. The total mass % of the TiC powder and the $TiO_2$ powder is 25 mass % or more and 50 mass % or less, for example. If the total mass of the TiC powder and the $TiO_2$ powder is regarded as 100 pts. mass, the mass ratio of the TiC powder is 70 pts. mass or more and 97.2 pts. mass or less, for example. The mass ratio of the $TiO_2$ powder is 2.8 pts. mass or more and 30 pts. mass or less, for example. The mass ratio of the $TiO_2$ powder is 1 pts. mass or more and 30 pts. mass or less (the balance is the TiC powder).

In the case where a powder material for forming the TiC phase after sintering (for example, TiN powder) is used in addition to the above-mentioned TiC powder and the $TiO_2$ powder, the total mass of the powder material for forming the TiC phase may be in the range of 25 mass % or more and 50 mass % or less with respect to 100 mass % as the total with the $Al_2O_3$ powder.

In the above-described mixing step, MgO, $Y_2O_3$, or the like used as a sintering aid may be added. However, if these sintering aid (additive) is too much, as shown in FIG. 3B, the lattice constant of the alumina phase after sintering is increased, so that in this embodiment, the addition amount may preferably sometimes be regulated. The addition amount may preferably be 500 ppm or less, and more preferably be 100 ppm or less, with the content other than additives as 100 mass %, for example. It is noted that in the case where less impurities are included in the alumina powder which is prepared in the above-mentioned process, and the lattice constant in the alumina powder is extremely low, the amount of sintering aid may be increased as compared with the above-mentioned range.

Next, by using a spray dryer, a compression granulator, an extrusion granulator, or the like, the above-formed mixed powder for sintering is granulated. Then the granulated mixed powder for sintering is compacted with a die, thereby obtaining a compact (pressurized powder body). Alternatively, the above-granulated mixed powder for sintering may be molded by utilizing dry pressure molding or cold isostatic hydropressure molding, thereby obtaining a compact.

The compact is subjected to, for example, hot-press sintering, or normal pressure sintering or atmospheric pressure sintering in non-oxidative atmosphere, thereby obtaining an AlTiC substrate as a sintered body. In addition to these steps, hot isostatic pressing (HIP) process may be added.

In the case of using a hot pressing apparatus, it is sufficient that the pressure sintering may be performed, for example, in an atmosphere of argon, helium, neon, nitrogen, vacuum, or the like, at a temperature of 1400° C. or more and 1800° C. or less. The reason why the sintering temperature is set to be 1400° C. or more and 1800° C. or less is that if the temperature is lower than 1400° C., there is a possibility that the sintering may not be sufficiently performed. If the temperature exceeds 1800° C., the grains of alumina crystals and TiC crystals are remarkably grown, so that there is a possibility that the mechanical characteristics may largely be deteriorated in addition to the possibility that the surface roughness after the working cannot be decreased.

As described above, when the pressure sintering is performed, a dense sintered body can be manufactured, and an AlTiC substrate with good strength can be obtained. After the pressure sintering step is performed as described above, hot isostatic pressure (HIP) sintering may be additionally performed. For example, when the hot isostatic pressure sintering is performed by applying a pressure of 150 MPa or more and 200 MPa or less at a temperature of 1350° C. or more and 1700° C. or less, the flexural strength can be 700 MPa or more. Especially, in order to reduce the number of micropores, the HIP sintering may be performed at a temperature of 1500° C. or more and 1700° C. or less.

Figure 1A:
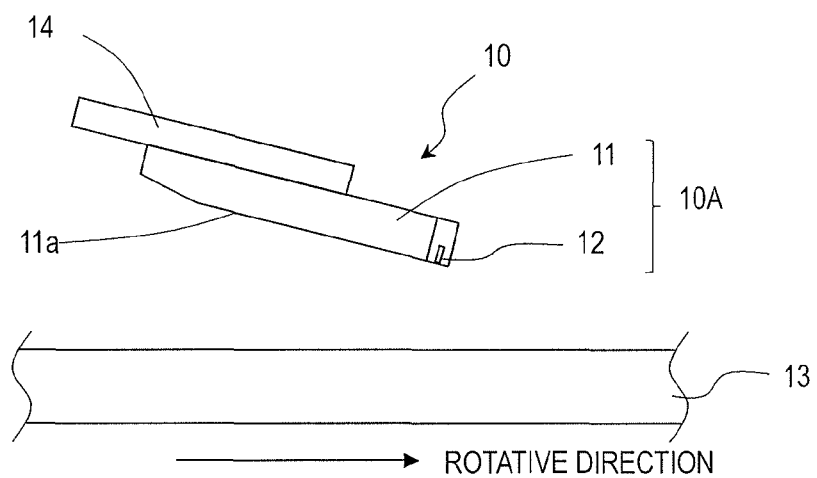
FIG. 1A and FIG. 1B are a side view and a perspective view of a magnetic head, respectively.
Figure 1B:
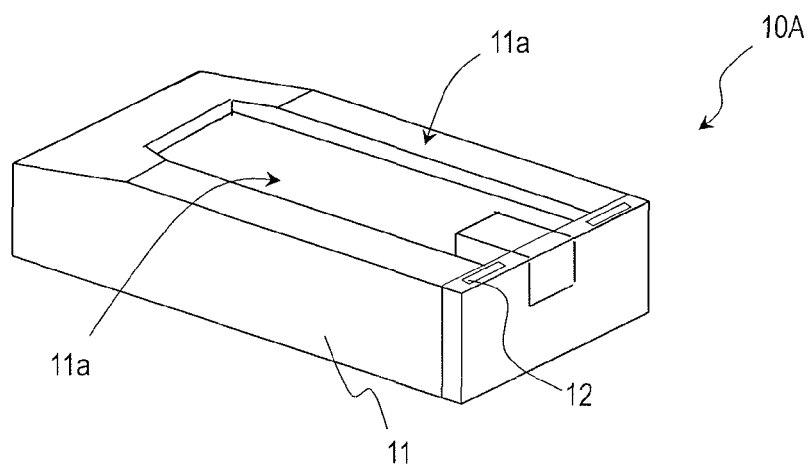
Figure 2A:
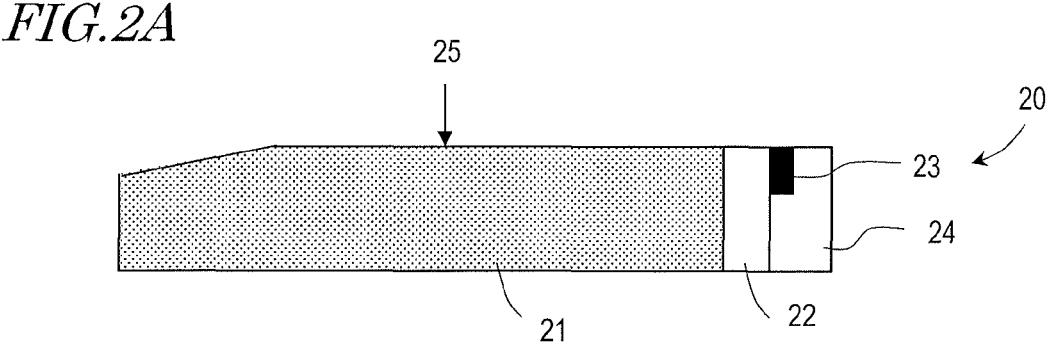
FIG. 2A and FIG. 2B are views showing a magnetic head in another embodiment.
Figure 2B:
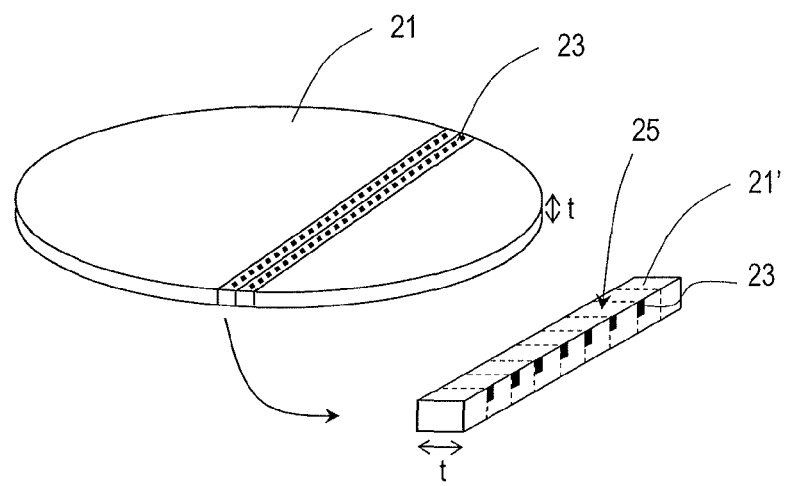

For the substrate surface of the AlTiC substrate, a plurality of devices, insulating films (such as an $Al_2O_3$ film) are formed via a known thin film depositing process. In addition, as shown in FIG. 2B, the AlTiC substrate 21 on which the transducer 23 is formed is cut into bars (row-bars) by using a dicing saw or the like, and then the cut surface (a side face perpendicular to the face on which the transducer 23 is formed) is subjected to lapping, thereby regulating the thickness and forming a smooth surface. In addition, by ion milling or the like, ABS suitable for the air flow in the smoothed surface is formed, and then cutting into chips is performed finally, thereby manufacturing a slider.

The ABS can be formed so as to have a desired shape by appropriately selecting processing conditions in the dry etching step such as ion milling or reactive ion etching. For example, in order to set the average roughness Ra of the ABS to be 25 nm or less, in the ion milling, it is sufficient that the ABS may be worked by setting the accelerating voltage to be 600 V, at a milling rate of 18 nm/minute with Ar ions for 75 to 125 minutes. In the reactive ion etching, it is sufficient that the ABS may be processed in the conditions where the flow rates of Ar gas and $CF_4$ gas are $3.4 \times 10^{-2}$ Pa·m³/s and $1.7 \times 10^{-2}$ Pa·m³/s, respectively, and the pressure of mixed gas is 0.4 Pa.

Hereinafter the embodiments of the present invention and comparative examples will be described.

Table 1 shows samples with different composition ratios (mass %) of alumina powder, TiC powder, and $TiO_2$ powder as material powders, and different amounts of MgO powder as sintering aid (external pts. mass with total content of alumina powder, TiC powder, and $TiO_2$ powder as 100 pts. mass), as samples Nos. 1 to 21 of the embodiments according to the present invention, and samples Nos. 101 to 108 of comparative examples.

For respective samples, lattice constants in sintered bodies (c-axis lattice constants of alumina phase and lattice constants of TiC phase). In addition, as evaluation items, thermal conductivity (W/(m·K)) and lapped surface smoothness (nm). The lapped surface smoothness (nm) represents the average roughness Ra (nm) of the worked surface after the lapping step.

Herein the case where the thermal conductivity is W/m·K or more is treated as a slider with good TPTR characteristic. Also, the case where the lapped surface smoothness is 1.5 nm or less is treated as a slider with good smoothness.

TABLE 1

| Sample No. | Alumina material Lattice Constant (Å) | Material (Powder) | | | | Lattice Constant (Å) of Sintered body | | Evaluation items | |
|---|---|---|---|---|---|---|---|---|---|
| | | $Al_2O_3$ (mass %) | TiC (mass %) | $TiO_2$ (mass %) | MgO (out mass %) | Alumina phase | TiC phase | Thermal conductivity (W/m · K) | Lapped surface smoothness (nm) |
| 1 | 12.983 | 65.0 | 34.0 | 1.0 | 0.005 | 12.985 | 4.325 | 28 | 1.3 |
| 2 | 12.983 | 65.0 | 31.0 | 4.0 | 0.005 | 12.985 | 4.316 | 26 | 1.2 |
| 3 | 12.983 | 65.0 | 30.0 | 5.0 | 0.005 | 12.985 | 4.314 | 25 | 1.0 |
| 4 | 12.983 | 65.0 | 26.0 | 9.0 | 0.005 | 12.985 | 4.300 | 20 | 0.5 |
| 5 | 12.983 | 65.0 | 34.0 | 1.0 | 0.030 | 12.989 | 4.325 | 27 | 1.4 |
| 6 | 12.983 | 65.0 | 31.0 | 4.0 | 0.030 | 12.989 | 4.316 | 25 | 1.2 |
| 7 | 12.983 | 65.0 | 30.0 | 5.0 | 0.030 | 12.989 | 4.314 | 24 | 1.0 |
| 8 | 12.983 | 65.0 | 27.0 | 8.0 | 0.030 | 12.989 | 4.306 | 20 | 1.0 |
| 9 | 12.983 | 65.0 | 26.0 | 9.0 | 0.030 | 12.989 | 4.300 | 20 | 0.8 |
| 10 | 12.983 | 65.0 | 34.0 | 1.0 | 0.050 | 12.992 | 4.325 | 26 | 1.5 |
| 11 | 12.983 | 65.0 | 31.0 | 4.0 | 0.050 | 12.992 | 4.316 | 24 | 1.2 |
| 12 | 12.983 | 65.0 | 30.0 | 5.0 | 0.050 | 12.992 | 4.314 | 23 | 1.0 |
| 13 | 12.983 | 65.0 | 27.0 | 8.0 | 0.050 | 12.992 | 4.306 | 20 | 0.9 |
| 14 | 12.983 | 65.0 | 25.0 | 10.0 | 0.005 | 12.985 | 4.297 | 20 | 0.5 |
| 15 | 12.983 | 65.0 | 25.0 | 10.0 | 0.030 | 12.989 | 4.297 | 20 | 0.7 |
| 16 | 12.983 | 65.0 | 25.0 | 10.0 | 0.050 | 12.992 | 4.297 | 20 | 0.7 |
| 17 | 12.983 | 65.0 | 31.2 | 3.8 | 0.040 | 12.991 | 4.317 | 25 | 1.2 |
| 18 | 12.983 | 65.0 | 32.2 | 2.8 | 0.032 | 12.990 | 4.320 | 26 | 1.3 |
| 19 | 12.983 | 65.0 | 32.2 | 2.8 | 0.038 | 12.991 | 4.320 | 25 | 1.3 |
| 20 | 12.983 | 65.0 | 32.4 | 2.6 | 0.045 | 12.992 | 4.321 | 25 | 1.4 |
| 21 | 12.983 | 65.0 | 30.5 | 4.5 | 0.045 | 12.992 | 4.315 | 24 | 1.1 |
| Comparative 101 | 12.983 | 65.0 | 34.5 | 0.5 | 0.030 | 12.989 | 4.327 | 27 | 1.6 |

TABLE 1-continued

|  | Alumina material Lattice Constant (Å) | Material (Powder) | | | | Lattice Constant (Å) of Sintered body | | Thermal conductivity (W/m·K) | Lapped surface smoothness (nm) |
|---|---|---|---|---|---|---|---|---|---|
| Sample No. |  | Al$_2$O$_3$ (mass %) | TiC (mass %) | TiO$_2$ (mass %) | MgO (out mass %) | Alumina phase | TiC phase |  |  |
| Comparative 102 | 12.983 | 65.0 | 20.0 | 15.0 | 0.030 | 12.989 | 4.293 | 19 | 0.6 |
| Comparative 103 | 12.983 | 65.0 | 34.5 | 0.5 | 0.050 | 12.992 | 4.327 | 27 | 1.7 |
| Comparative 104 | 12.983 | 65.0 | 20.0 | 15.0 | 0.005 | 12.985 | 4.293 | 19 | 0.4 |
| Comparative 105 | 12.983 | 65.0 | 34.0 | 1.0 | 0.060 | 12.993 | 4.325 | 24 | 1.7 |
| Comparative 106 | 12.983 | 65.0 | 31.0 | 4.0 | 0.070 | 12.995 | 4.316 | 19 | 1.5 |
| Comparative 107 | 12.983 | 65.0 | 27.0 | 8.0 | 0.070 | 12.995 | 4.306 | 19 | 1.0 |
| Comparative 108 | 12.983 | 65.0 | 26.0 | 9.0 | 0.070 | 12.995 | 4.300 | 19 | 0.9 |

The examples Nos. 1 to 21, and the comparative examples Nos. 101 to 108 utilize alumina material powder which is closer to α-alumina having a corundum structure and of which the c-axis lattice constant is 12.983 Å. The alumina material powder having such a lattice constant may contain Na, Mg, Ca, or the like of 10 ppm or less as impurity. It is noted that depending on the addition amount of MgO which is added as a sintering aid, as shown in Table 1, the lattice constant in the sintered body (the AlTiC substrate) varies.

The lattice constants in the respective samples of various compositions were measured by the following method. Specifically, 10 test pieces each having the size of about 30 mm×30 mm×1 mm are cut out from each sample. Each cut-out test piece is irradiated with Cu-target K-characteristic X-ray with tube voltage of 45 kV and tube current of 40 mA. In the range of diffraction angle of 2θ=20 degrees to 80 degrees, X-ray diffraction patterns obtained by the scanning of the step size of 0.017° and at the scan speed of 0.42°/sec are analyzed by using Rietveld analysis program of X'Pert High Score Plus by PANalytical, thereby obtaining lattice constants of the Al$_2$O$_3$ phase and the TiC phase. If necessary, for the obtained X-ray diffraction pattern, data processing such as Kα separation, background subtraction, or smoothing may be performed. By this method, measurement is performed at arbitrary ten points of each cut-out test piece, an averaged value of 10 pieces×10 points is calculated, thereby obtaining a lattice constant of respective sample.

FIG. 4 shows the distribution of c-axis lattice constants of alumina phase and lattice constants of TiC phase for respective samples. In FIG. 4, the horizontal axis indicates the c-axis lattice constant of the alumina phase, and the vertical axis indicates the lattice constant of the TiC phase.

As known from Table 1 and FIG. 4, in the embodiments of the samples No. 1 to No. 21 in which the c-axis lattice constants of the alumina phases were in the range of 12.985 Å or more and 12.992 Å or less, and the lattice constants of the TiC phases were in the range of 4.297 Å or more and 4.325 Å or less, it was confirmed that both of the thermal conductivity and the lapped surface smoothness were good. Although not shown in Table 1, in the samples No. 1 to No. 21, it was confirmed that a phase with a different etching rate (the third phase) other than the alumina phase and the TiC phase was not generated in the sintered body, and it was possible to prevent the degradation of surface roughness after the dry etching for forming the ABS.

Especially in the samples No. 1, No. 5, No. 10, and No. 18 to No. 20 with the lattice constants of the TiC phase in the range of 4.318 Å to 4.325 Å, the thermal conductivity was 25 W/(m·K) which was particularly high, so that it was confirmed that the occurrence of defects due to TPTR could be effectively suppressed. Although not described in the above embodiment, when the lattice constant of the TiC phase was 4.318 Å, and the c-axis lattice constant of the alumina phase was in the range of 12.985 Å to 12.989 Å, the thermal conductivity was about 26 W/(m·K).

As known from Table 1, in the samples No. 3, No. 4, Nos. 7 to 9, Nos. 12 to 16, and No. 21 with the lattice constants of the TiC phase in the range of 4.297 Å to 4.315 Å, it was confirmed that the thermal conductivity was good, and the lapped surface smoothness (the average roughness Ra) was 1.1 nm or less, so that a very smooth surface could be obtained. Although not shown in Table 1, in the samples of which the lattice constant of the TiC phase was in the range of 4.297 Å to 4.315 Å (especially 4.306 Å or less), it was found that the cutting workability was high, i.e., 28 bars or more (herein the number of cut bars when the cutting resistance reached the resistive value of 0.4 KW in the cutting step with a dicing saw). With high cutting workability, the productivity can be improved.

As for the samples No. 102 and No. 104 of the comparative examples, the lapped surface smoothness was good, but the thermal conductivity was low, so that the TPTR characteristic was not so good. In addition, in the samples No. 102 and No. 104 of the comparative examples, it was confirmed that after the dry etching step for forming the ABS, the surface roughness was remarkably deteriorated.

It is considered that this is because when the lattice constant of the TiC phase is too low, a third phase with a different etching speed (for example, an Al$_2$TiO$_5$ phase) is formed in the sintered body. Accordingly, although not shown in Table 1, unlike the samples No. 1 to No. 21 of the embodiments, in the samples No. 102 and No. 104 of the comparative examples, it was confirmed that sufficient smoothness could not be obtained for the ABS surface, so that it was not suitable for the use as a slider.

In the above description, the substrate for a thin-film magnetic head in the embodiment according to the present invention has been described. In addition, a hard disk drive device can be manufactured by a known method with a magnetic head slider manufactured by using the above-described substrate for the magnetic head.

As shown in FIG. 5, a hard disk drive device 100 in an embodiment of the present invention includes, for example, a magnetic head slider 2 having the above-described configuration, a magnetic disk (a platter) 4, a motor 6 for causing the magnetic disk 4 to rotate, a controller 8 configured to control the positioning of the magnetic head slider 2 with respect to the magnetic disk 4 and control the writing/reading operation by the magnetic head slider 2, and the like. The controller 8 may be configured so that the head slider 2 is moved to a specific position on the platter 4 in response to the reading/writing signal from the external. In the hard disk drive device, it is possible to accurately maintain the gap between the magnetic head slider and the platter in the writing/reading operation in a very narrow condition. In addition, the occurrence of defect due to the TPTR can be prevented, so that the recording with high recording density can be realized.

The $Al_2O_3$—TiC based substrate for a thin-film magnetic head according to the embodiments of the present invention can be suitably used in a hard disk drive which realizes high recording density.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

This application is based on Japanese Patent Application No. 2014-134419 filed on Jun. 30, 2014, the entire contents of which are hereby incorporated by reference.

What is claimed is:

1. An $Al_2O_3$—TiC based substrate for a thin-film magnetic head including an $Al_2O_3$ phase and a TiC phase, wherein a c-axis lattice constant of the $Al_2O_3$ phase is 12.985 Å or more and 12.992 Å or less, and a lattice constant of the TiC phase is 4.297 Å or more and 4.325 Å or less.

2. The $Al_2O_3$—TiC based substrate for a thin-film magnetic head according to claim 1, wherein the c-axis lattice constant of the $Al_2O_3$ phase is 12.991 Å or less.

3. The $Al_2O_3$—TiC based substrate for a thin-film magnetic head according to claim 2, wherein the c-axis lattice constant of the $Al_2O_3$ phase is 12.990 Å or less.

4. The $Al_2O_3$—TiC based substrate for a thin-film magnetic head according to claim 1, wherein the c-axis lattice constant of the $Al_2O_3$ phase is 12.989 Å or more.

5. The $Al_2O_3$—TiC based substrate for a thin-film magnetic head according to claim 1, wherein the lattice constant of the TiC phase is 4.318 Å or more and 4.325 Å or less.

6. The $Al_2O_3$—TiC based substrate for a thin-film magnetic head according to claim 1, wherein the lattice constant of the TiC phase is 4.297 Å or more and 4.315 Å or less.

7. A magnetic head slider comprising the $Al_2O_3$—TiC based substrate for a thin-film magnetic head recited in claim 1.

8. A hard disk drive device comprising the magnetic head slider recited in claim 7.

* * * * *